United States Patent [19]

Arnao

[11] Patent Number: 4,860,456

[45] Date of Patent: Aug. 29, 1989

[54] FORMS LAYOUT GAUGE

[76] Inventor: Marlene Arnao, 6661 W. 87th Pl., Los Angeles, Calif. 90045

[21] Appl. No.: 173,028

[22] Filed: Mar. 22, 1988

Related U.S. Application Data

[63] Continuation of Ser. No. 3,722, Jan. 16, 1987, abandoned.

[51] Int. Cl.$^4$ .............................................. G01B 5/26

[52] U.S. Cl. .................................................... 33/1 B

[58] Field of Search ................. 33/1 B, 1 C, 1 R, 137, 33/494

[56] References Cited

U.S. PATENT DOCUMENTS 4,466,192 8/1984 Ager .................................... 33/1 B 4,599,798 7/1986 Steele .................................... 33/1 B

FOREIGN PATENT DOCUMENTS 529509 1/1955 Italy .................................... 33/1 B

*Primary Examiner*—Harry N. Haroian

[57] ABSTRACT

A forms layout gauge for measuring the coordinates of blank spaces on a paper form at which to print characters using a computer-controlled printer, the gauge consisting of a transparent sheet having printed thereon a plurality of rows of vertically-oriented characters in line spacing and a plurality of rows of horizontally-oriented characters in intersecting relation in pitch spacing to form a grid defining a multiplicity of rectangular windows through which the underlying paper form can be viewed.

14 Claims, 2 Drawing Sheets

FORMS LAYOUT GAUGE

CROSS-REFERENCE TO RELATED APPLICATIONS

This is a continuation of application Ser. No. 003,722 filed Jan. 16, 1987, now abandoned.

BACKGROUND OF THE INVENTION

This invention relates to a forms layout gauge for measuring the coordinates of blank spaces on a paper form at which to print characters using a computer-controlled printer.

Word processing equipment has come into use on an enormous scale, particularly word processing equipment comprising a personal computer having a display screen, a word processing program, and a printer controlled by the computer during execution of the word processing program.

Such word processing equipment has significant advantages over a typewriter in most circumstances. However, in a circumstance involving a preprinted paper form having blank spaces that are to be filled in during printing, use of such word processing equipment has involved difficulty. A widely practiced trial and error approach to dealing with this difficulty is to make a test run in which one of the preprinted forms is inserted into the printer, and the word processing equipment is used to print characters on the inserted form. Based on seeing where the characters print during the test run, the operator of the equipment can perform editing operations so that blank spaces on of the same preprinted form can be completed with the correct alignment.

This widely practiced trial and error approach is time-consuming. In a given office where many different preprinted forms are in use, any of which may be revised from time to time, it is quite time-consuming and burdensome to carry out this trial and error approach over and over again with the various different forms and the various different revised forms.

An alternative approach is to us a ruler to make a series of measurements to determine horizontal and vertical coordinates for each of a group of particular blank character spaces on the preprinted form. In one of the series of measurements, the ruler is oriented to extend left to right across the form to measure the distance between the left edge of the form and a particular blank character space. In another of the series of measurements, the ruler is oriented to extend up and down across the form to measure the distance between the top edge of the form and the particular blank character space.

Special rulers are in widespread use for making such sequential measurements. One such special ruler has numerous scales, such as a scale in units of 10 pitch (i.e, 10 character spaces per inch), other scales in units of 12 pitch and 15 pitch, and other scales in units of 6 lines per inch and 8 lines per inch. Because such special rulers have such multiple scales, and because the scales are in units that are standard for printers (i.e., 10 pitch, 12 pitch, 15 pitch; 6 lines per inch and 8 lines per inch), they are much more useful than an ordinary 12-inch ruler for dealing with this matter. Notwithstanding the improvement such a special ruler provides, its use, like the use of an ordinary 12-inch ruler, involves repeated rotation of the ruler between horizontal and vertical orientations, and on each such repetition the ruler needs to be translated back and forth until it is lined up properly relative to an edge of the form.

As indicated by the problems involved in the foregoing approaches, there is a substantial need for an improved, easier to use, gauge for dealing with this matter.

SUMMARY OF THE INVENTION

This invention can be defined as a forms layout gauge for measuring the coordinates of blank spaces on a paper form at which to print characters using a computer-controlled printer. The gauge comprises a sheet for fitting atop the paper form. The sheet is transparent and has printed on it a plurality of rows of characters and a plurality of columns of characters. The rows and columns intersect to form a grid defining a multiplicity of identically sized and shaped rectangular windows which provide an unobscured view of the underlying paper form. The characters in the rows and the characters in the columns have the same orientation, so that when the sheet is fitted atop the paper form such that the characters in the rows appear upright, the characters in the columns likewise appear upright. The characters printed on the sheet are selected from a symbol set comprising the decimal digits and are spaced apart from each other so as to form means for measuring the coordinates of blank spaces on the paper form in units of pitch and line spacing.

In contrast to the prior art special rulers, there is no need to reorient the gauge according to this invention so as to make sequential measurements. To the contrary, the sheet, once fitted atop the paper form enables the simultaneous measurement of pitch distance and line distance of any particular blank space on the paper form.

In the presently preferred embodiment, the symbol set for the characters includes alphabetic characters as well as the decimal digits. In this embodiment, the alphabetic characters "A", "B", "C", etc., appear spaced apart and in alphabetical order to mark the tenth horizontal coordinate positions of each row, and to mark the tenth vertical coordinate positions of each column. In other words, the symbol "A" indicates position 1, "B" indicates position 11, "C" indicates position 21, etc.

In one exemplary embodiment of the invention, the sheet is $8\frac{1}{2}$ inches by 11 inches so as to cover a standard letter-size paper form completely, and the rows of characters extend across the shorter (i.e., $8\frac{1}{2}''$) dimension of the sheet, with the characters being spaced apart from each other to provide for measuring in units of standard 10 pitch spacing. The characters in the columns are spaced apart from each other to provide for measuring in units of standard 6-lines per inch spacing.

Other exemplary embodiments of the invention provide sheets sized to cover completely other standard-size paper forms, such as legal-size paper forms. Further, on any of the sheets, whether letter-sized, legal-sized, or otherwise, the character spacing can be such as to provide measurements in other units including 12-pitch spacing, 15-pitch spacing, and line-and-a-half spacing (which is equivalent to double spacing at 8 lines per inch).

The foregoing and other distinguishing and advantageous features of the invention are described in more detail below and are recited in the appended claims.

DETAILED DESCRIPTION

Figure 1:
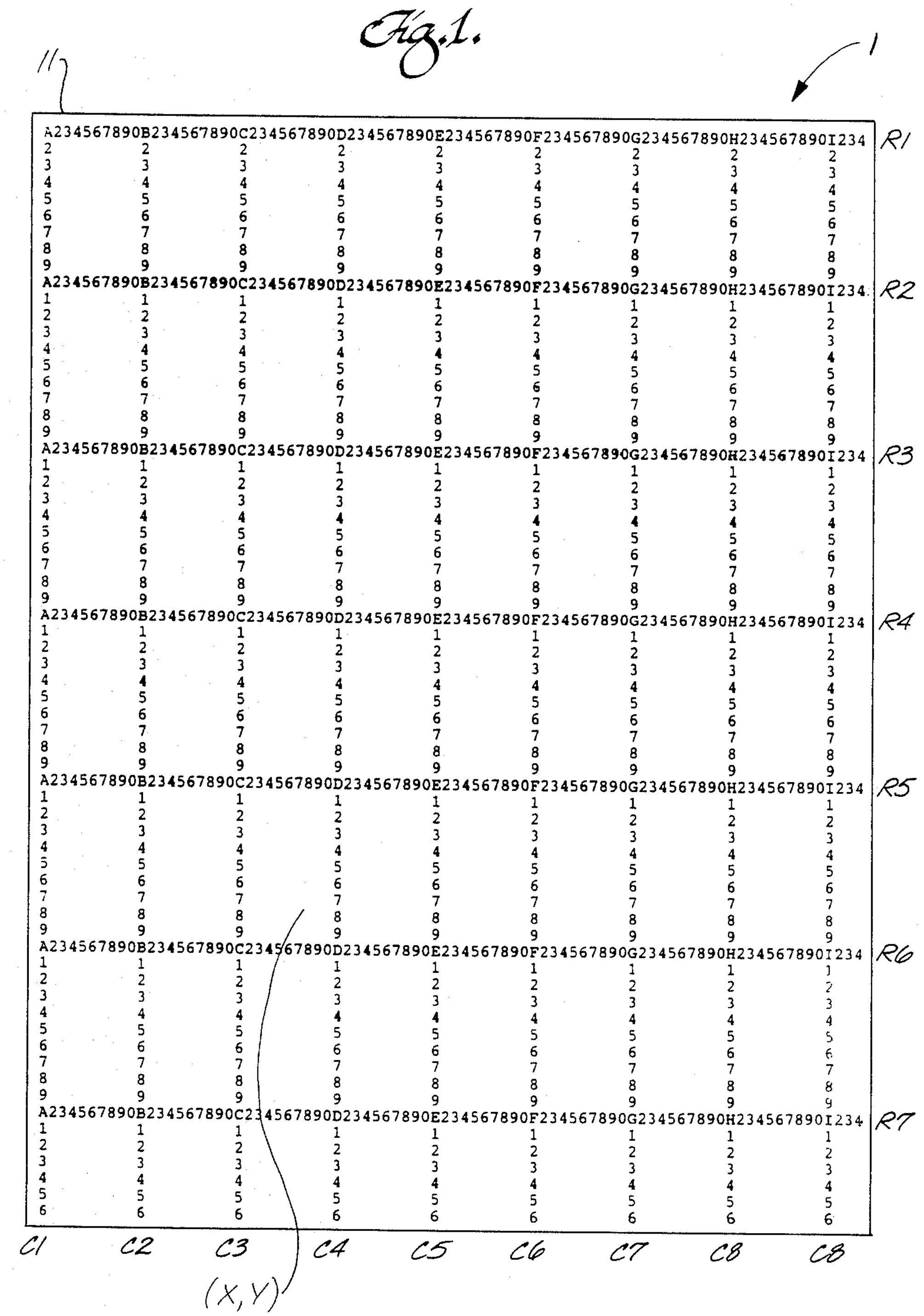
FIG. 1 shows an embodiment of the forms layout gauge of this invention in which the character spacing for each row of characters provides for measuring a horizontal coordinate in units of 10 pitch and the character spacing for each column provides for measuring a vertical coordinate in terms of 6 lines per inch, this gauge being particularly adapted for use with paper forms printed in portrait mode.

In FIG. 1, a forms layout gauge 1 embodying this invention comprises a sheet 11 that is 8½ inches wide and 11 inches long. The sheet 11 is transparent and has printed on it seven rows (R1–R7) of characters and nine columns (C1–C9) of characters. The rows and characters intersect to form a grid defining a multiplicity of rectangular windows such as window (x,y) that are all identically sized and shaped. The windows provide an unobscured view of any paper form over which the forms layout gauge is fitted in use.

The characters printed on sheet 11 are selected from the symbol set comprising the decimal digits, (i.e., "0" to "9"). In each of the rows (R1–R7), the decimal digits "2" to "9" and "0" appear in a repeating sequence, and the alphabetic characters "A", "B", etc. through "I" appear at positions corresponding to 1, 11, 21, etc., through 81. The character spacing in the rows is at 10 pitch; i.e., there are ten characters per inch.

In each of the columns (C1–C9), the decimal digits "1" to "9" appear in a repeating sequence. The alphabetic characters mentioned above are located at the intersections of the rows and columns and thus appear in both.

All the characters, whether in the rows or the columns, are printed in portrait orientation on the sheet 11. This is an important feature in making it easy to use the gauge, such use being further described below.

As a representative example of how the form layout gauge 1 is used, consider a preprinted form that an escrow company might want to fill in, using a printer controlled by a computer. The preprinted form would show certain "boilerplate" text and have numerous blank entry areas in which to fill in information such as Escrow No., Date, Escrow Officer, various line items concerning cash deposits, names and addresses of buyers and sellers, and so forth. Such blank entry areas typically are spread out all over the printed form. By fitting the form layout gauge 1 atop such a printed form, it is easy to read off very quickly all the coordinates of the starting blank character spaces of the various entry areas. With the information readily provided by using the form layout gauge, the operator of the word processing equipment can set margins, tabs, etc., and keyboard in the names, addresses, dates, dollar amounts, etc., at corresponding screen lines and screen column positions, and then print out the keyboarded information on the preprinted form in correct alignment.

As indicated by the foregoing, the nature and arrangement of the characters on the transparent sheet 11 are such as to form a means for measuring the coordinates of blank spaces on the paper form in units of pitch and line spacing.

Figure 2:
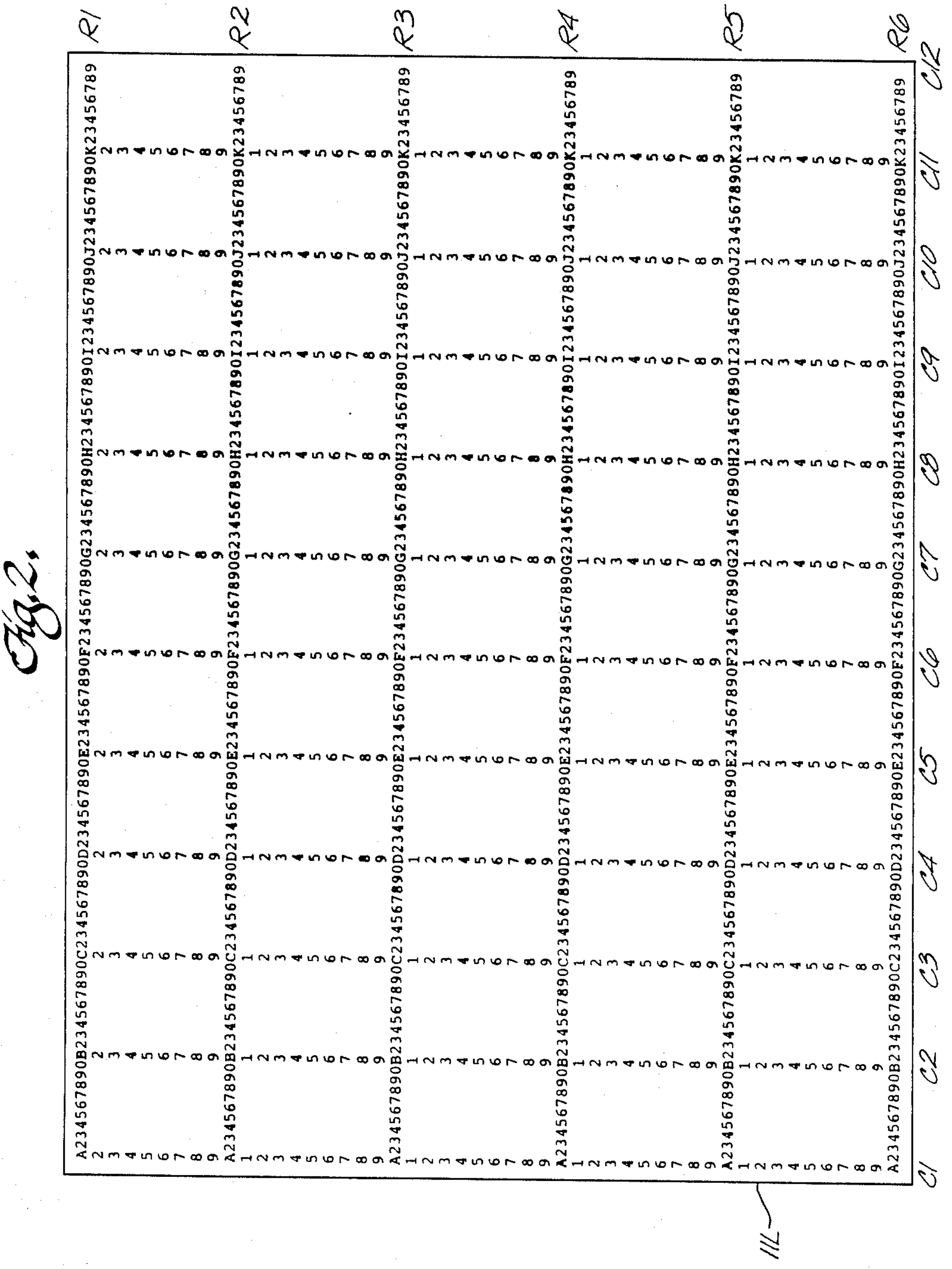
FIG. 2 shows another embodiment of the forms layout gauge of this invention, which embodiment is particularly adapted for use with paper forms printed in landscape mode.

FIG. 2 depicts a landscape embodiment of this invention. In this embodiment, the sheet 11L is letter-size, and has rows R1–R6 extending lengthwise across the long (11 inches) length of the sheet. Like the portrait embodiment of FIG. 1, the characters are selected from a symbol set comprising the decimal digits, and all the characters appear upright when the sheet is oriented with the rows extending left to right. In this embodiment, there are in excess of 100 characters per row.

The landscape embodiment of FIG. 2 and the embodiment of FIG. 1 are used in the same way, the landscape embodiment being particularly appropriate for use in printing out spreadsheets.

The above-described embodiments of the present invention are exemplary, and other embodiments fall within the scope of this invention.

I claim:

1. A forms layout gauge for measuring the coordinates of blank spaces on a paper form at which to print characters using a computer-controlled printer, the gauge consisting essentially of:

a sheet for fitting atop the paper form;

the sheet being transparent and having, solely for coordinate determination, printed thereon a plurality of rows of vertically-oriented characters in line spacing and a plurality of rows of horizontally-oriented characters, in pitch spacing the vertically-oriented and horizontally-oriented rows intersecting sized and shaped rectangular windows through which the underlying paper from can be viewed;

the characters in the rows having the same orientation so that when the sheet is fitted atop the paper form, the characters in the vertically-oriented rows appear upright, the characters in the horizontally-oriented rows likewise appear upright;

the characters between each intersection being selected from a common symbol set comprising single integer decimal digits and being spaced apart from each other along the rows so as to form means for measuring the coordinates of blank spaces on the paper form in units of pitch and line spacing.

2. A forms layout gauge in accord with claim 1, wherein the sheet is rectangular and wherein the characters printed on the sheet are printed in accord with portrait mode.

3. A forms layout gauge in accord with claim 2, wherein the characters in the rows are space from each other to provide for measuring in units of 10-pitch spacing.

4. A forms layout gauge in accord with claim 3, wherein the characters in the columns are spaced from each other to provide for measuring in units of 6 lines per inch spacing.

5. A forms layout gauge in accord with claim 2, wherein there are at least 80 characters per row.

6. A forms layout gauge in accord with claim 2, wherein the symbol set includes alphabetic characters.

7. A forms layout gauge in accord with claim 6, wherein a plurality of alphabetic characters are printed in each row in alphabetic order, each such alphabetic character being located at an intersection of a row and a column.

8. A forms layout gauge in accord with claim 1, wherein the sheet is rectangular and wherein the characters printed on the sheet are printed in accord with landscape mode.

9. A forms layout gauge in accord with claim 8, wherein the characters in the rows are spaced from each other to provide for measuring in units of 10-pitch spacing.

10. A forms layout gauge in accord with claim 9, wherein the characters in the columns are spaced from each other to provide for measuring in units of 6 lines per inch spacing.

11. A forms layout gauge in accord with claim 8, wherein there are at least 100 characters per row.

12. A forms layout gauge in accord with claim 8, wherein the symbol set includes alphabetic characters.

13. A forms layout gauge in accord with claim 12, wherein a plurality of alphabetic characters are printed in each row in alphabetic order, each such alphabetic character being located at an intersection of a row and a column.

14. A method of adding information to a form containing blank spaces for information which comprises:

(a) laying a forms layout gauge for measuring the coordinates of blank spaces on a paper form at which to print characters using a computer-controlled printer, the gauge consisting essentially of:

a sheet for fitting atop the paper form;

the sheet being transparent and having, solely for coordinate determination, printed thereon a plurality of rows of vertically-oriented characters in line spacing and a plurality of rows of horizontally-oriented characters, in pitch spacing the vertically-oriented and horizontally-oriented rows intersecting to form a grid defining a multiplicity of identically sized and shaped rectangular windows through which the underlying paper form can be viewed;

the characters in the rows having the same orientation so that when the sheet is fitted atop the paper form, the characters in the vertically-oriented rows appear upright, the characters in the horizontally-oriented rows likewise appear upright;

the characters between each intersection being selected from a common symbol set comprising single integer decimal digits and being spaced apart from each other along the rows so as to form means for measuring the coordinates of blank spaces on the paper form in units of pitch and line spacing;

(b) reading from the form the coordinates of each blank where an entry is to be made;

(c) entering in a word processor based on the determined coordinates the entry for each blank where an entry is to be made; and (d) printing out using a computer controlled printer the entered information in blanks of the form in correct alignment.

* * * * *